United States Patent
Shen

(10) Patent No.: US 11,420,228 B2
(45) Date of Patent: Aug. 23, 2022

(54) APPARATUS AND METHOD FOR REMOVING BUBBLES IN FLEXIBLE SUBSTRATE

(71) Applicant: WUHAN CHINA STAR OPTOELECTRONICS SEMICONDUCTOR DISPLAY TECHNOLOGY CO., LTD., Hubei (CN)

(72) Inventor: Haiyang Shen, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 532 days.

(21) Appl. No.: 16/471,498

(22) PCT Filed: Apr. 17, 2019

(86) PCT No.: PCT/CN2019/083035
§ 371 (c)(1),
(2) Date: Jun. 19, 2019

(87) PCT Pub. No.: WO2020/155409
PCT Pub. Date: Aug. 6, 2020

(65) Prior Publication Data
US 2021/0362184 A1    Nov. 25, 2021

(30) Foreign Application Priority Data
Jan. 30, 2019 (CN) .......................... 201910089172.3

(51) Int. Cl.
| B05D 3/04 | (2006.01) |
|---|---|
| B05D 3/02 | (2006.01) |
| C03C 17/32 | (2006.01) |
| H01L 51/56 | (2006.01) |

(52) U.S. Cl.
CPC ........... *B05D 3/048* (2013.01); *B05D 3/0254* (2013.01); *C03C 17/32* (2013.01); *H01L 51/56* (2013.01); *B05D 2203/35* (2013.01); *B05D 2505/50* (2013.01); *C03C 2218/32* (2013.01)

(58) Field of Classification Search
CPC .. B05D 3/048; B05D 3/0254; B05D 2203/35; B05D 2505/50; C03C 17/32; C03C 2218/32; H01L 51/56
See application file for complete search history.

(56) References Cited

U.S. PATENT DOCUMENTS

| 5,854,468 A  * | 12/1998 | Muka ................ H01L 21/67109 219/390 |
| 2009/0190908 A1* | 7/2009 | Shibagaki ......... H01L 21/68785 392/416 |
| 2018/0341148 A1* | 11/2018 | Takehara ............ G02F 1/13452 |

* cited by examiner

*Primary Examiner* — Anne M Hines

(57) ABSTRACT

The present disclosure provides an apparatus for removing bubbles in a flexible substrate. The flexible substrate includes a baseplate and a polyimide layer coated on the baseplate. The apparatus includes a chamber including a top wall, a sidewall, and a bottom wall, wherein the top wall, the sidewall, and the bottom wall define an accommodation space; a heating plate disposed in the accommodation space; and a cooling conduit embedded in at least one of the top wall and the sidewall of the chamber.

9 Claims, 1 Drawing Sheet

APPARATUS AND METHOD FOR REMOVING BUBBLES IN FLEXIBLE SUBSTRATE

FIELD OF INVENTION

The present disclosure relates to a field of display technology, and more particularly, to an apparatus and a method for removing bubbles in a flexible substrate.

BACKGROUND

Polyimide (PI) is a polymer having a lot of repeating imide units, where polyimide possesses some advantageous properties, such as being able to be used in wide temperature ranges, being chemical corrosion resistant, having high strength, and having excellent insulation. Thus, PI is used as a base material of flexible substrates that is applied in a variety of flexible electronic display products.

A PI-based flexible organic light emitting diode (OLED) display panel is manufactured by coating PI liquid onto a baseplate, and then curing the PI liquid by baking the same. During coating of the PI liquid, a lot of bubbles are formed in a PI layer. As the PI liquid is gradually cured, these bubbles remain in the PI layer, thus resulting in decrease of manufacturing yield of flexible electronic display products.

It is believed that these bubbles are produced because: (1) before coating of the PI liquid, air enters the PI liquid and thus bubbles are generated in the PI liquid; and (2) during baking of the PI liquid, volatile substances evaporating from the PI layer results in formation of bubbles in the PI layer.

According to prior art, techniques currently used to remove bubbles are performed before coating of the PI liquid. For example, one technique involves placing the PI liquid in a vacuum environment before coating of the PI liquid, and vacuum suction is carried out to remove bubbles therein. Another technique employs filtration of the PI liquid several times to remove bubbles therein. However, there no existing technique disclose how to remove bubbles formed due to volatilization of substances from the PI layer after coating of the PI liquid.

Therefore, there is a need to provide an apparatus and a method for removing bubbles in a flexible substrate.

SUMMARY OF DISCLOSURE

Technical Problems

The objective of the present disclosure is to provide an apparatus and a method for removing bubbles in a flexible substrate in order to solve problems existing in prior art, where bubbles exist in PI layer.

Technical Solutions

To solve the above-said problems, the present disclosure provides an apparatus for removing a plurality of bubbles in a flexible substrate, wherein the flexible substrate includes a baseplate and a polyimide layer coated on the baseplate, the apparatus comprising:

a chamber including a top wall, a sidewall, and a bottom wall, wherein the top wall, the sidewall, and the bottom wall define an accommodation space;

a heating plate disposed in the accommodation space; and
a cooling conduit embedded in at least one of the top wall and the sidewall of the chamber.

In accordance with one preferred embodiment of the present disclosure, the sidewall includes a gas inlet and a gas outlet disposed opposite to the gas inlet.

In accordance with one preferred embodiment of the present disclosure, the cooling conduit includes a cooling fluid circulating therein, and the cooling fluid is maintained at about room temperature.

In accordance with one preferred embodiment of the present disclosure, the apparatus further comprises:

a plurality of supporting pins, wherein the supporting pins moveably pass through a plurality of through-holes formed in the heating plate, and are configured to lift or lower the flexible substrate disposed on the heating plate.

In accordance with one preferred embodiment of the present disclosure, the apparatus further comprises:

a gas pipeline connected to the top wall and the sidewall.

In addition, the present disclosure provides a method for removing a plurality of bubbles in a flexible substrate, wherein the flexible substrate includes a baseplate and a polyimide layer coated on the baseplate, the method comprising steps of:

providing the flexible substrate into an apparatus, wherein the apparatus comprises:
  a chamber including a top wall, a sidewall, and a bottom wall, wherein the top wall, the sidewall, and the bottom wall define an accommodation space;
  a heating plate disposed in the accommodation space; and
  a cooling conduit embedded in at least one of the top wall and the sidewall of the chamber;

heating a bottom portion of the flexible substrate using the heating plate, wherein the heating plate is controlled at a temperature ranging from 550° C. and 750° C.; and cooling a top portion of the flexible substrate using the cooling conduit, wherein the cooling conduit is maintained at about room temperature.

In accordance with one preferred embodiment of the present disclosure, the sidewall includes a gas inlet and a gas outlet disposed opposite to the gas inlet, and the method further comprises steps of:

injecting nitrogen gas or inert gas via the gas inlet to cool the flexible substrate; and discharging a plurality of volatile substances evaporating from the flexible substrate via the gas outlet.

In accordance with one preferred embodiment of the present disclosure, the apparatus further comprises a gas pipeline connected to the top wall and the sidewall; and the method further comprises a step of injecting nitrogen gas or inert gas via the gas pipeline to cool the flexible substrate.

BENEFICIAL EFFECTS

Compared to prior art, the present disclosure provides an apparatus and a method for removing bubbles in a flexible substrate. By controlling temperatures of bottom portion and top portion of the PI layer, gases in bottom portion of the PI layer evaporate faster than gases in the top portion of the PI layer. Therefore, bubbles in the PI layer can be effectively removed.

DETAILED DESCRIPTION

Figure 1:
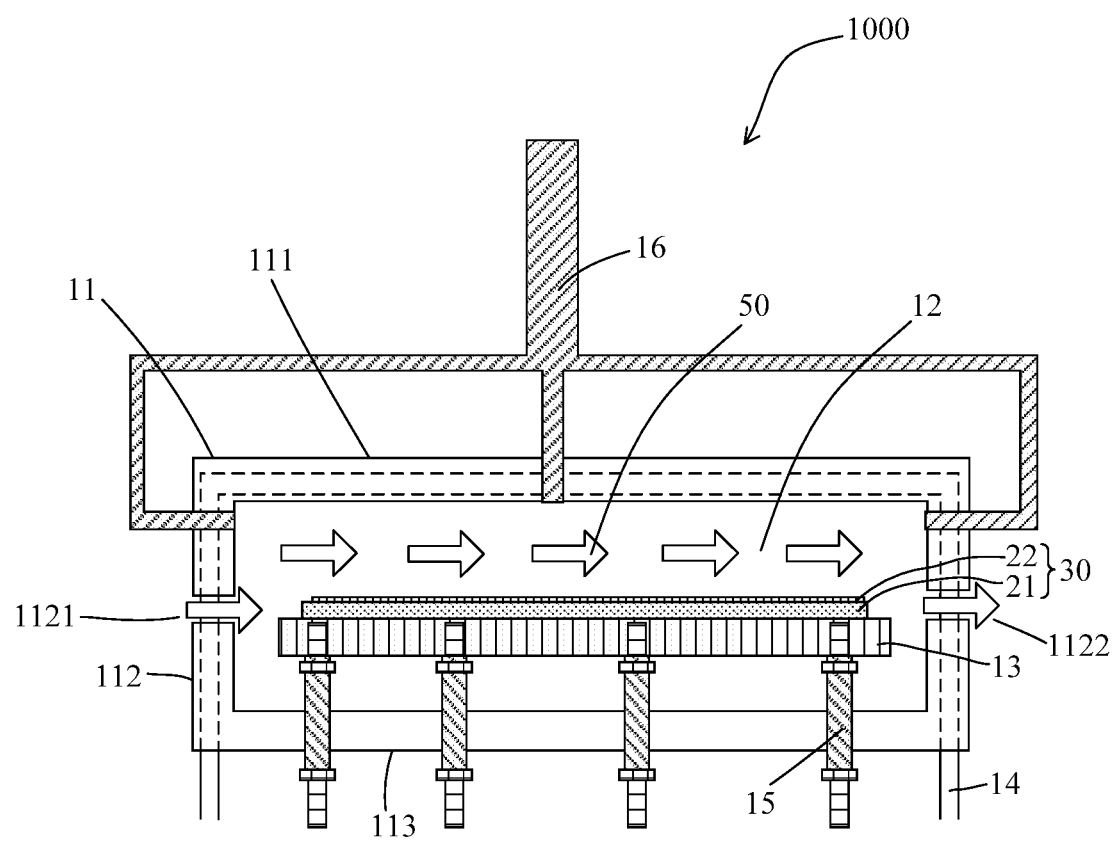
FIG. 1 shows a cross-sectional view of an apparatus for removing a plurality of bubbles in a flexible substrate according to one preferred embodiment of the present disclosure.

The following embodiments refer to the accompanying drawings for exemplifying specific implementable embodiments of the present disclosure. Moreover, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto. In the drawings, the same reference symbol represents the same or similar components.

Please refer to FIG. 1, which shows a cross-sectional view of an apparatus for removing a plurality of bubbles in a flexible substrate according to one preferred embodiment of the present disclosure.

The present disclosure provides an apparatus 1000 for removing a plurality of bubbles in a flexible substrate 30. The flexible substrate 30 includes a baseplate (e.g., a glass plate) 21 and a polyimide (PI) layer 22 coated on the baseplate 21. The apparatus 1000 includes:

a chamber 11 including a top wall 111, a sidewall 112, and a bottom wall 113, wherein the top wall 111, the sidewall 112, and the bottom wall 113 define an accommodation space 12;

a heating plate 13 disposed in the accommodation space 12; and a cooling conduit 14 embedded in at least one of the top wall 111 and the sidewall 112 of the chamber 11.

Because the substances evaporating from the PI layer 22 are generally composed of gases, and gaseous volatile substances have a low density, volatile substances evaporate upwards. In addition, the bottom surface of the PI layer 22 contacts with the baseplate (e.g., a glass plate) 21, and it would not be possible for volatile substances to escape downwards from the bottom surface of the PI layer 22. Thus, volatile substances escape from the top surface of the PI layer 22.

The heating plate 13 is used to heat the bottom surface of the PI layer 22, wherein the heating plate 13 is controlled at a temperature ranging from 550° C. and 750° C. In addition, the cooling conduit 14 is used to cool the top surface of the PI layer 22, wherein the cooling conduit 14 includes a cooling fluid circulating therein, and the cooling fluid is maintained at about room temperature. Preferably, the cooling fluid can be gas or liquid, such as nitrogen gas or water. In other words, according to the present disclosure, the heating plate 13 and the cooling conduit 14 are used to control temperature of the bottom surface and the top surface of the PI layer 22, respectively, and thus the bottom portion of the PI layer 22 has a temperature higher than that of the top portion of the PI layer 22. This makes that gases in the bottom portion of the PI layer 22, having a higher temperature, evaporate faster than gases in the top portion of the PI layer 22 having a lower temperature. For this reason, bubbles in the bottommost portion of the PI layer 22 evaporate upwards first. Once bubbles in the bottommost portion of the PI layer 22 are removed, bubbles at levels higher than the bottommost portion of the PI layer 22 will be removed successively. Therefore, the present disclosure achieves functional effect that bubbles in the PI layer 22 are effectively removed.

In the present embodiment, the sidewall 112 includes a gas inlet 1121 and a gas outlet 1122 disposed opposite to the gas inlet 1121. After the PI layer 22 is coated on the baseplate (e.g., a glass plate) 21, the flexible substrate 30 composed of the PI layer 22 and the baseplate 21 is transferred and placed into the apparatus 1000. Nitrogen gas or other inert gas is injected into the accommodation space 12 via the gas inlet 1121, and are discharged via the gas outlet 1122. That is, nitrogen gas or other inert gas is circulating in the apparatus 1000 (as shown to be arrows 50) in order to maintain heat energy inside the apparatus 1000. Nitrogen gas or other inert gas is used to prevent oxidization of the PI layer 22. Once the PI layer 22 is completely cured, injection of nitrogen gas or other inert gas could also function to cool the flexible substrate 30. Moreover, the gas outlet 1122 is configured to discharge volatile substances evaporating from the PI layer 22.

The apparatus 1000 further includes a gas pipeline 16 connected to the top wall 111 and the sidewall 112. Nitrogen gas or other inert gas is injected into the accommodation space 12 via the gas pipeline 16. Nitrogen gas or other inert gas is used to prevent oxidization of the PI layer 22. Once the PI layer 22 is completely cured, injection of nitrogen gas or other inert gas could also function to cool the flexible substrate 30.

The apparatus 1000 further includes a plurality of supporting pins 15. The supporting pins 15 moveably pass through a plurality of through-holes formed in the heating plate 13, and are configured to lift or lower the flexible substrate 30 disposed on the heating plate 13. For instance, once the flexible substrate 30 is transferred into the apparatus 1000, the supporting pins 15 rise up first to make top of the supporting pins 15 to contact the bottom surface of the flexible substrate 30. Thereafter, the supporting pins 15 descend to a predetermined altitude to make the flexible substrate 30 to be supported by the heating plate 13. After removal of bubbles in the flexible substrate 30 by the apparatus 1000 is completed, the supporting pins 15 support the flexible substrate 30 and lift the flexible substrate 30 to an adequate altitude, and then the flexible substrate 30 is transported to outside of the apparatus 1000.

The cooling conduit 14 could be embedded in the top wall 111 solely, be embedded in the sidewall 112 solely, or be embedded in both the top wall 111 and the sidewall 112. As long as the cooling conduit 14 achieves the function effect that the top portion of the PI layer 22 can be controlled, the present invention does not limit where the cooling conduit 14 are disposed.

In addition, the present disclosure provides a method for removing a plurality of bubbles in a flexible substrate 30. The flexible substrate 30 includes a baseplate (e.g., a glass plate) 21 and a polyimide layer 22 coated on the baseplate. The method includes steps of:

providing the flexible substrate 30 into an apparatus 1000, wherein the apparatus 1000 comprises:

a chamber 11 including a top wall 111, a sidewall 112, and a bottom wall 113, wherein the top wall 111, the sidewall 112, and the bottom wall 113 define an accommodation space 12;

a heating plate 13 disposed in the accommodation space 12; and a cooling conduit 14 embedded in at least one of the top wall 111 and the sidewall 112 of the chamber 11;

heating a bottom portion of the flexible substrate 30 using the heating plate 13, wherein the heating plate 13 is controlled at a temperature ranging from 550° C. and 750° C.; and cooling a top portion of the flexible substrate 30 using the cooling conduit 14, wherein the cooling conduit 14 is maintained at about room temperature.

In the present embodiment, the sidewall 112 includes a gas inlet 1121 and a gas outlet 1122 disposed opposite to the gas inlet 1121. The method further includes steps of injecting nitrogen gas or inert gas via the gas inlet 1121 to cool the flexible substrate 30, and discharging a plurality of volatile substances evaporating from the flexible substrate 30 via the gas outlet 1122.

In the present embodiment, the apparatus 1000 further includes a gas pipeline 16 connected to the top wall 111 and the sidewall 112. The method further includes a step of injecting nitrogen gas or inert gas via the gas pipeline 16 to cool the flexible substrate 30.

Compared to prior art, the present disclosure provides an apparatus and a method for removing bubbles in a flexible substrate. By controlling temperatures of a bottom portion and top portion of the PI layer, gases in the bottom portion of the PI layer evaporate faster than gases in the top portion of the PI layer. Therefore, bubbles in the PI layer can be effectively removed.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. An apparatus for removing a plurality of bubbles in a flexible substrate, wherein the flexible substrate includes a baseplate and a polyimide layer coated on the baseplate, the apparatus comprising:
    a chamber including a top wall, a sidewall, and a bottom wall, wherein the top wall, the sidewall, and the bottom wall define an accommodation space;
    a heating plate disposed in the accommodation space; and
    a cooling conduit embedded in both the top wall and the sidewall of the chamber;
    wherein the cooling conduit includes a cooling fluid circulating therein, and the cooling fluid is maintained at about room temperature.

2. The apparatus for removing the bubbles in the flexible substrate according to claim 1, wherein the sidewall includes a gas inlet and a gas outlet disposed opposite to the gas inlet.

3. The apparatus for removing the bubbles in the flexible substrate according to claim 1, further comprising:
    a plurality of supporting pins, wherein the supporting pins moveably pass through a plurality of through-holes formed in the heating plate, and are configured to lift or lower the flexible substrate disposed on the heating plate.

4. The apparatus for removing the bubbles in the flexible substrate according to claim 1, further comprising:
    a gas pipeline connected to the top wall and the sidewall.

5. An apparatus for removing a plurality of bubbles in a flexible substrate, wherein the flexible substrate includes a baseplate and a polyimide layer coated on the baseplate, the apparatus comprising:
    a chamber including a top wall, a sidewall, and a bottom wall, wherein the top wall, the sidewall, and the bottom wall define an accommodation space;
    a heating plate disposed in the accommodation space; and
    a cooling conduit embedded in at least one of the top wall and the sidewall of the chamber.

6. The apparatus for removing the bubbles in the flexible substrate according to claim 5, wherein the sidewall includes a gas inlet and a gas outlet disposed opposite to the gas inlet.

7. The apparatus for removing the bubbles in the flexible substrate according to claim 5, wherein the cooling conduit includes a cooling fluid circulating therein, and the cooling fluid is maintained at about room temperature.

8. The apparatus for removing the bubbles in the flexible substrate according to claim 5, further comprising:
    a plurality of supporting pins, wherein the supporting pins moveably pass through a plurality of through-holes formed in the heating plate, and are configured to lift or lower the flexible substrate disposed on the heating plate.

9. The apparatus for removing the bubbles in the flexible substrate according to claim 5, further comprising:
    a gas pipeline connected to the top wall and the sidewall.

\* \* \* \* \*